United States Patent
Wang

(10) Patent No.: US 9,678,243 B2
(45) Date of Patent: Jun. 13, 2017

(54) DETECTION DEVICE AND METHOD FOR DETECTING SOMETHING EXISTED IN THE HIGH TEMPERATURE CAVITY

(71) Applicant: SHENZHEN CHINA STAR OPTOELECTRONICS TECHNOLOGY CO., LTD., Shenzhen, Guangdong (CN)

(72) Inventor: Song Wang, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 373 days.

(21) Appl. No.: 14/413,142

(22) PCT Filed: Jan. 30, 2014

(86) PCT No.: PCT/CN2014/071842
§ 371 (c)(1),
(2) Date: Jan. 6, 2015

(87) PCT Pub. No.: WO2015/109612
PCT Pub. Date: Jul. 30, 2015

(65) Prior Publication Data
US 2016/0320524 A1 Nov. 3, 2016

(30) Foreign Application Priority Data
Jan. 23, 2014 (CN) .......................... 2014 1 0033542

(51) Int. Cl.
*G01V 8/12* (2006.01)
*C03B 29/02* (2006.01)
(Continued)

(52) U.S. Cl.
CPC .............. *G01V 8/12* (2013.01); *C03B 29/025* (2013.01); *C03B 29/08* (2013.01); *G01V 9/00* (2013.01)

(58) Field of Classification Search
CPC ........ C03B 29/025; C03B 29/08; G01V 8/12; G01V 9/00
See application file for complete search history.

(56) References Cited

U.S. PATENT DOCUMENTS

2002/0148319 A1  10/2002  Miguchi
2003/0015516 A1*  1/2003  Natsuhara ......... H01L 21/67103
                                                            219/444.1

FOREIGN PATENT DOCUMENTS

CN   200989946 Y   12/2007
CN   102798900 A   11/2012
(Continued)

OTHER PUBLICATIONS

Xin Ma, the International Searching Authority written comments, Jun. 2014, CN.

*Primary Examiner* — Francis M Legasse, Jr.

(57) ABSTRACT

A detection device for detecting something existed in the high temperature cavity, for detecting the glass substrate sending into or outing of the high temperature cavity, wherein, the detection device comprises a deflection probe and a detection element, the deflection probe comprises a fixed probe and the deflection probe in the same line, which is assembled at the side wall of the high temperature cavity, when the glass substrate is sending into the high temperature cavity and touching the deflection probe, the deflection probe will be connected with the detection element, the detection element will send out a electrical sensor signal for showing the glass substrate is push into the cavity. Therefore, it can be determined in time that the glass substrate and the other elements are still existed in the high temperature
(Continued)

cavity or not with some simple machines or detection elements, the detecting process is timely and accurately.

17 Claims, 1 Drawing Sheet

(51) Int. Cl.
*C03B 29/08* (2006.01)
*G01V 9/00* (2006.01)

(56) References Cited

FOREIGN PATENT DOCUMENTS

| | | | |
|---|---|---|---|
| CN | 202649489 U | | 1/2013 |
| CN | 202693496 U | | 1/2013 |
| CN | 203084219 U | | 7/2013 |
| CN | 203149137 U | | 8/2013 |
| CN | 203190963 U | | 9/2013 |
| JP | S63-70433 A | | 3/1988 |
| JP | H05-330549 A | | 12/1993 |
| JP | 2002-093885 A | | 3/2002 |
| JP | 2005150555 A | * | 6/2005 |

* cited by examiner

DETECTION DEVICE AND METHOD FOR DETECTING SOMETHING EXISTED IN THE HIGH TEMPERATURE CAVITY

FIELD OF THE INVENTION

The present invention relates to a detection device and detecting method, more particularly relates to a detection device and method for detecting something existed in the high temperature cavity.

BACKGROUND OF THE INVENTION

During the manufacture process of the glass substrate, the glass substrate is desired to take off from the high temperature cavity to the low temperature cavity. The operating processes will be completed in the closed cavity. In the prior art, the condition of entering and outing from the high temperature cavity of the glass substrate is recorded by a profession software. Using the profession software, it can be determined that whether the glass substrate is existed in the high temperature cavity or not. When the equipment is on examining or repairing, the glass substrate has been draw out from the high temperature cavity. And then, if the recording information cannot be updated in time, then the next feeding process and the exhausting process will be out of control, so that the mistaking probability in manufacture processes will be raised. Therefore, it is necessary to provide a detection device and method for detecting something existed in the high temperature cavity.

SUMMARY OF THE INVENTION

The main purpose of the invention is provided for a detection device and detecting method for determining whether the glass substrate existed in the high temperature cavity or not.

A detection device for detecting something existed in the high temperature cavity, for detecting the glass substrate sending into or outing of the high temperature cavity, wherein, the detection device comprising a deflection probe and a detection element, the deflection probe comprises a fixed probe and the deflection probe in the same line, which is assembled at the side wall of the high temperature cavity, when the glass substrate is sending into the high temperature cavity and then touching the deflection probe, the deflection probe will be connected with the detection element, the detection element will send out a electrical sensor signal for showing the glass substrate is push into the high temperature cavity.

Perfectly, the weight of two ends of the deflection probe are different, presetting the touch end to the glass substrate is a first end arm and the touch end to the contact probe is a second end arm, the weight of the first end arm is less than that of the second end arm, so that the first end arm will be warped.

Perfectly, the detection element can be selected of the grating sensor or the pressure sensitive sensor. When the grating sensor is used to be the detection element, the grating sensor comprises a light emitter, a contact probe and a light receiver, wherein the light emitter and the contact probe are connecting with together, when the glass substrate is touched by the deflection probe, the light emitter can be connected with the deflection probe by backswing, and then the intensity of the light source will be reduced and a light sensor signal will be transformed into a electrical sensor signal to send out. When the pressure sensitive sensor is used to be the detection element, the contact probe is reach out from the front end of the pressure sensitive sensor, with the glass substrate touching the deflection probe, the pressure sensitive sensor can be connected with the deflection probe by backswing, if the present pressure is larger than the presetting pressure, then the light sensor signal will be transformed into the electrical sensor signal to send out.

Perfectly, the detection device further comprises a seal bearing which mounted on the side wall of the high temperature cavity, and the deflection probe will be passed through from the seal bearing and rotated around it up and down. The high temperature cavity can be sealed for prevent leaking off with the deflection probe fixed by the seal bearing.

The present invention is further provided a detection method for detecting something existed in the high temperature cavity, for detecting the glass substrate sending into or outing of the high temperature cavity, wherein, when on the initial state, there is no glass substrate in the high temperature cavity, the deflection probe is in the normal inclined state and the deflection probe is not connected with the contact probe, so that the detection element will not be electrical conducted; when the deflection probe is deflecting by pressed, the deflection probe is connected with the contact probe, so that the detection element will be electrical conducted to send out the electrical sensor signal for showing the glass substrate enter the high temperature cavity.

The detection element can be selected of the grating sensor or the pressure sensitive sensor. With the glass substrate touching the deflection probe, the pressure sensitive sensor can be connected with the deflection probe by backswing, if the present light intensity or the pressure alteration value is larger than the presetting value, then the light sensor signal will be transformed into the electrical sensor signal to send out.

Compared to the prior art, the present invention is provided for a detection device for detecting something existed in the high temperature cavity, for detecting the glass substrate sending into or outing of the high temperature cavity. When the glass substrate is sending into the high temperature cavity, the deflection probe is deflecting by the pressure of the glass substrate, and the deflection probe will be connected with the contact probe, so that the detection element will be electrical conducted to send out the electrical sensor signal for showing the glass substrate enter the high temperature cavity. As the same way, when the glass substrate is leaving the high temperature cavity, the detected light intensity and the pressure will be changed for determined whether the glass substrate is still existed in it or not. Therefore, it can be determined in time that the glass substrate and the other elements are still existed in the high temperature cavity or not with some simple machines or conventional detection elements, so as to reduce the mistakes which produced from the recording of the feeding process or the exhausting process by the professional software, and also reduce the phenomenon of the materials not match with the produces during the producing, and without using the thermo-stabile elements applying on the detecting in the high temperature cavity. As a result, the developing cost will be reduced and the materials and supplies will be detected with timely and accurately.

DETAILED DESCRIPTION OF THE PREFERRED EMBODIMENTS

Figure 1:
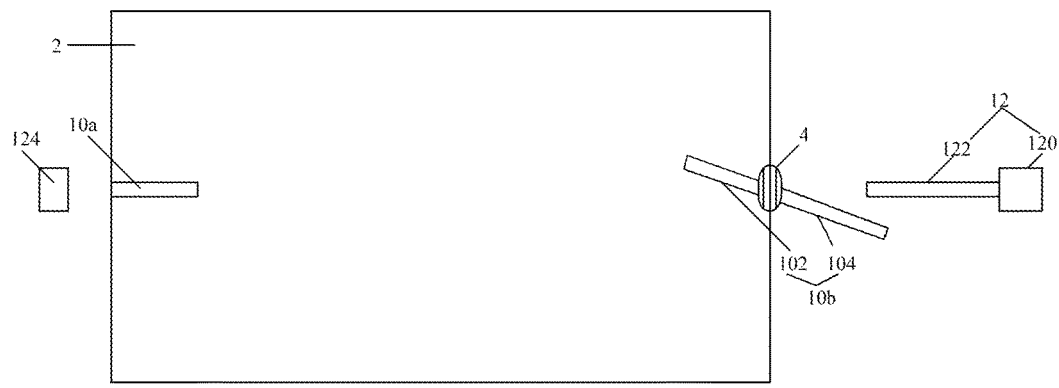
FIG. 1 is a perspective view in initial state of detection device for detecting something existed in the high temperature cavity according to the present invention.
Figure 2:
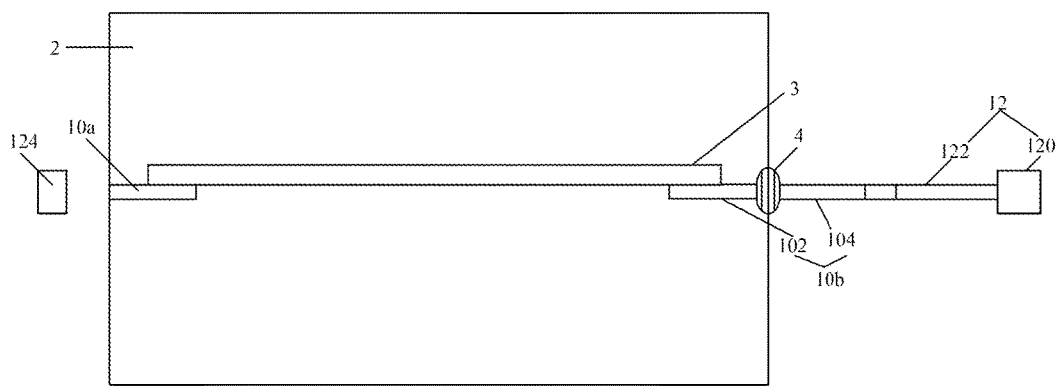
FIG. 2 is a perspective view when the glass substrate in the high temperature cavity of detection device for detecting something existed in the high temperature cavity according to the present invention.

For timely detecting the articles in the high temperature cavity, referring to FIG. 1 and FIG. 2, the present invention is provided for a detection device for detecting something existed in the high temperature cavity, for detecting the glass substrate 3 sending into or outing of the high temperature cavity, wherein, the detection device comprises a deflection probe and a detection element 12, which is located at any side of the high temperature cavity. The deflection probe comprises a fixed probe 10a and the deflection probe 10b in the same line, which is assembled at the side wall of the high temperature cavity 2. When the glass substrate 3 is sending into the high temperature cavity 2 and then touching the deflection probe 10b, the deflection probe 10b will be connected with the detection element 12, the detection element 12 will send out an electrical sensor signal for showing the glass substrate 3 is push into the high temperature cavity 2. With the machinery detecting by the detection device, the glass substrate 3 can be determined whether is existed inside the high temperature cavity 2 or not. The detection device is mounted on the sidewall of the high temperature cavity 2, if the glass substrate 3 contacts with the detection device, the detection device will be contacted to send the electrical sensor signal.

The weight of two ends of the deflection probe 10b are different, wherein, presetting the touch end to the glass substrate is a first end arm 102 and the touch end to the contact probe is a second end arm 104, the weight of the first end arm 102 is less than that of the second end arm 104.

In a free deflecting state, the deflection probe 10 is not pressed by the glass substrate 3, then the first end arm 102 will be tilted up and the second end arm 104 will be hung down to make the glass substrate 3 into the high temperature cavity. When the glass substrate 3 presses upon the first end arm 102, the first end arm 102 will be tilted up to touch the detection element 12. Perfectly, the length of the first end arm 102 is less than that of the second end arm 104, and the weight of the first end arm 102 is less than that of the second end arm 104, so as to keep the deflection probe 10 on incline and cut off the detection element 12.

In the present invention, the detection element 12 can be selected of the grating sensor or the pressure sensitive sensor. In the first embodiment, when the grating sensor is used to be the detection element, the grating sensor comprises a light emitter 120, a contact probe 122 and a light receiver 124. In the grating sensor, there is a distance between the light emitter 120 and the high temperature cavity 2. The light receiver 124 is mounted at the same side of the light emitter 120 or the fixed probe 10a. Perfectly, the light receiver 124 is mounted on the same side of the fixed probe 10a. The light emitter 120, the glass substrate 3 and the light receiver 124 are positioned on the same line. If there is no glass substrate 3 entering into the high temperature cavity 2, the deflection probe 10b will be in a free deflecting state and not be contacted with the contact probe 122. And now, the light emitter 120 will be closed and not transmit the light source. If there is a glass substrate 3 entering into the high temperature cavity 2, the deflection probe 10b will change the angle pressed by the glass substrate 3. The light emitter 120 can be connected to emit the light source with the deflection probe 10b by backswing, and then the intensity of the light source will be reduced and a light sensor signal will be transformed into an electrical sensor signal to send out, for showing the glass substrate 3 is entering into the high temperature cavity 2.

When the pressure sensitive sensor is used to be the detection element 12, the contact probe is reach out from the front end of the pressure sensitive sensor, with the glass substrate touching the deflection probe, the pressure sensitive sensor can be connected with the deflection probe by backswing, if the present pressure is larger than the presetting pressure, then the light sensor signal will be transformed into the electrical sensor signal to send out for showing the glass substrate into the high temperature cavity.

The grating sensor or the pressure sensitive sensor can be electrically connected to the contact probe 122 by the deflection probe 10b, with detecting the variety of the light intensity or the pressure, the glass substrate 3 can be detected whether existed into the high temperature cavity.

Perfectly, the detection device further comprises a seal bearing 4 which mounted on the side wall of the high temperature cavity 2, and the deflection probe 10b will be passed through from the seal bearing 4 and rotated around it up and down. The seal bearing 4 is used for fixing the deflection probe 10b and sealing the high temperature cavity to prevent the gas leaking or penetrating from the holes on the sidewall of the high temperature cavity 2 by the deflection probe 10b.

In the present invention, there are several detection devices in parallel, for detecting several glass substrates whether are inserted in the high temperature cavity or not.

The present invention is also provided for a detection method for detecting something existed in the high temperature cavity, for detecting the glass substrate 3 sending into or outing of the high temperature cavity. In the original state, there is no glass substrate 3 in the high temperature cavity 2. When the deflection probe 10b is on a heeling state, the first end arm 102 will be tilted up to touch the detection element 12, and the second end arm 104 will be hung down to make no contact with the contact probe 122 and not to connect the detection element 12. When the deflection probe 10b is rotated by pressed, the glass substrate 3 will be press the fixed probe 10a and the deflection probe 10b. If the second end arm 104 of the deflection probe 10b contacts to the contact probe 122, then the grating sensor will be connected to emit the light source. When the moment of the emitting, the light source will be received by the light receiver 124, and then the light source will be warded off by the glass substrate 3 with the pushing of the glass substrate 3. And then the light intensity will be weaken, and then a light sensor signal will be transformed into an electrical sensor signal to send out, for showing the glass substrate 3 is entering into the high temperature cavity 2. If the glass substrate leaves the fixed probe 10a and the deflection probe 10b, then the deflection probe 10b will recover to be in the free deflecting state. In the state, the deflection probe 10b will break down the connecting with the contact probe 122, and then the light emitter 120 will stop emitting. So the light receiver 124 will not receive any light source, and then a light sensor signal will be transformed into an electrical sensor signal to send out, for showing the glass substrate 3 has left the high temperature cavity 2.

The detection element 12 can be selected of the grating sensor or the pressure sensitive sensor. When the deflection probe 10 contacts the contact probe 122, the pressure detection element 12 can be connected with the deflection probe 10 by backswing. If the light intensity variation value or the pressure variation value detected by the detection element is larger than the presetting value, then the light sensor signal will be transformed into the electrical sensor signal to send out, so as to determine whether the glass substrate is existing into the high temperature cavity or not.

What is claimed is:

1. A detection device for detecting something existed in the high temperature cavity, for detecting the glass substrate sending into or outing of the high temperature cavity, the detection device comprising a deflection probe and a detection element, wherein the deflection probe comprises a fixed probe and the deflection probe in the same line, which is assembled at the side wall of the high temperature cavity, when the glass substrate is sending into the high temperature cavity and then touching the deflection probe, the deflection probe will be connected with the detection element, the detection element will send out a electrical sensor signal for showing the glass substrate is push into the high temperature cavity, the detection device further comprises a seal bearing which mounted on the side wall of the high temperature cavity, and the deflection probe will be passed through from the seal bearing and rotated around it up and down.

2. The detection device for detecting something existed in the high temperature cavity according to claim 1, wherein the detection element can be selected from a grating sensor or a pressure sensitive sensor.

3. The detection device for detecting something existed in the high temperature cavity according to claim 2, when the grating sensor is used to be the detection element, the grating sensor comprises a light emitter, a contact probe and a light receiver, wherein the light emitter and the contact probe are connecting with together, when the glass substrate is touched by the deflection probe, the light emitter can be connected with the deflection probe by backswing, and then the intensity of the light source will be reduced and a light sensor signal will be transformed into a electrical sensor signal to send out.

4. The detection device for detecting something existed in the high temperature cavity according to claim 3, wherein the light receiver can be mounted at the same side with the light emitter or the fixed probe.

5. The detection device for detecting something existed in the high temperature cavity according to claim 2, wherein, when the pressure sensitive sensor is used to be the detection element, the contact probe is reach out from the front end of the pressure sensitive sensor, with the glass substrate touching the deflection probe, the pressure sensitive sensor can be connected with the deflection probe by backswing, if the present pressure is larger than the presetting pressure, then the light sensor signal will be transformed into the electrical sensor signal to send out.

6. The detection device for detecting something existed in the high temperature cavity according to claim 1, wherein the weight of two ends of the deflection probe are different, presetting the touch end to the glass substrate is a first end arm and the touch end to the contact probe is a second end arm, the weight of the first end arm is less than that of the second end arm.

7. The detection device for detecting something existed in the high temperature cavity according to claim 6, wherein the length of the first end arm is less than that of the second end arm.

8. A detection device for detecting something existed in the high temperature cavity, for detecting the glass substrate sending into or outing of the high temperature cavity, the detection device comprising a deflection probe and a detection element, wherein the deflection probe comprises a fixed probe and the deflection probe in the same line, which is assembled at the side wall of the high temperature cavity, when the glass substrate is sending into the high temperature cavity and then touching the deflection probe, the deflection probe will be connected with the detection element, the detection element will send out a electrical sensor signal for showing the glass substrate is push into the high temperature cavity.

9. The detection device for detecting something existed in the high temperature cavity according to claim 8, wherein the detection element can be selected from a grating sensor or a pressure sensitive sensor.

10. The detection device for detecting something existed in the high temperature cavity according to claim 9, wherein the detection device further comprises a seal bearing which mounted on the side wall of the high temperature cavity, and the deflection probe will be passed through from the seal bearing and rotated around it up and down.

11. The detection device for detecting something existed in the high temperature cavity according to claim 9, when the grating sensor is used to be the detection element, the grating sensor comprises a light emitter, a contact probe and a light receiver, wherein the light emitter and the contact probe are connecting with together, when the glass substrate is touched by the deflection probe, the light emitter can be connected with the deflection probe by backswing, and then the intensity of the light source will be reduced and a light sensor signal will be transformed into an electrical sensor signal to send out.

12. The detection device for detecting something existed in the high temperature cavity according to claim 11, wherein the light receiver can be mounted at the same side with the light emitter or the fixed probe.

13. The detection device for detecting something existed in the high temperature cavity according to claim 9, wherein, when the pressure sensitive sensor is used to be the detection element, the contact probe is reach out from the front end of the pressure sensitive sensor, with the glass substrate touching the deflection probe, the pressure sensitive sensor can be connected with the deflection probe by backswing, if the present pressure is larger than the presetting pressure, then the light sensor signal will be transformed into the electrical sensor signal to send out.

14. The detection device for detecting something existed in the high temperature cavity according to claim 8, wherein the weight of two ends of the deflection probe are different, presetting the touch end to the glass substrate is a first end arm and the touch end to the contact probe is a second end arm, the weight of the first end arm is less than that of the second end arm.

15. The detection device for detecting something existed in the high temperature cavity according to claim 14, wherein the length of the first end arm is less than that of the second end arm.

16. A detection method for detecting something existed in the high temperature cavity, for detecting the glass substrate sending into or outing of the high temperature cavity, wherein, when on the initial state, there is no glass substrate in the high temperature cavity, the deflection probe is in the normal inclined state and the deflection probe is not connected with the contact probe, so that the detection element will not be electrical conducted; when the deflection probe is deflecting by pressed, the deflection probe is connected with the contact probe, so that the detection element will be electrical conducted to send out the electrical sensor signal for showing the glass substrate enter the high temperature cavity; when the glass substrate leaves the fixed probe and the deflection probe, the deflection probe will be on a free inclining state to cut off the contacting with the contact probe, so that the detection element will not be electrical conducted to send out another electrical sensor signal for showing the glass substrate having left the high temperature cavity.

17. The detection method for detecting something existed in the high temperature cavity according to claim 16, wherein the detection element can be selected from a grating sensor or a pressure sensitive sensor, when the deflection probe is deflecting by pressed and touching the contact probe, the detection element will be electrical conducted, when the light intensity variation value or the pressure variation value detected by the detection element is larger than the presetting value, then the detection element will send out a electrical sensor signal.

* * * * *